C. G. IMLAY.
Assignor, by mesne assignments, to E. A. SMALL.
FARE BOX.
No. 9,858. Reissued Sept. 6, 1881.
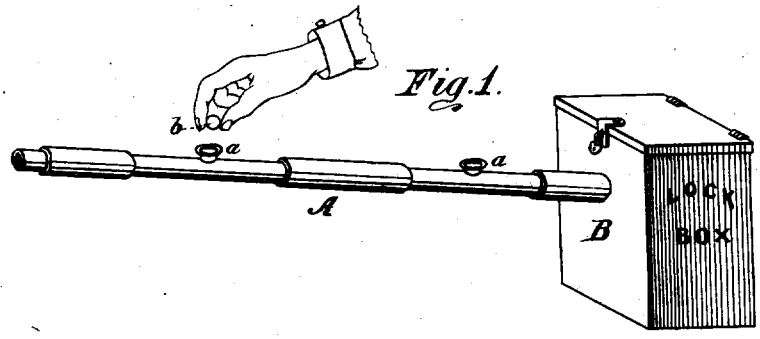
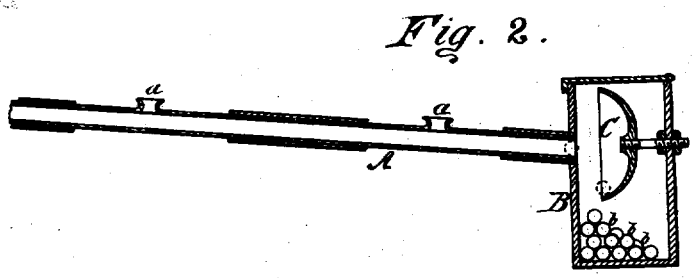
*Witnesses:*
Will. H. Davis
A. Watts
*Inventor:*
C. G. Imlay
by J. J. Greenough
N. PETERS, Photo-Lithographer, Washington, D. C.

UNITED STATES PATENT OFFICE.

CHARLES G. IMLAY, OF PHILADELPHIA, PENNSYLVANIA, ASSIGNOR BY MESNE ASSIGNMENTS, TO EMILY A. SMALL, OF BUFFALO, N. Y.

FARE-BOX.

SPECIFICATION forming part of Reissued Letters Patent No. 9,858, dated September 6, 1881.

Original No. 160,676, dated March 9, 1875. Application for reissue filed July 23, 1881.

*To all whom it may concern:*

Be it known that I, CHARLES G. IMLAY, of the city and county of Philadelphia, in the State of Pennsylvania, have invented certain new and useful Improvements in Fare-Boxes for the collection of fares on street-cars and other passenger-vehicles, of which the following is a description, with reference to the accompanying drawings, which form a part of this specification.

The object of my invention is twofold—first, to afford a check upon conductors for the number of fares paid for and collected by them; and, secondly, to more readily and conveniently collect the tokens of payment for fares on those cars or vehicles in which they are deposited in locked boxes.

My device consists, principally, of a tube or trough extending longitudinally through the car and opening at one end into a lock-box stationed at that point, with apertures opening into said tube or trough, on the upper side, to receive a token of payment for the fare at any convenient point along its length. This tube or trough should be inclined somewhat from a horizontal line in its fixed position sufficient to cause balls or tokens *b* for the fare received to run into the lock-box or receptacle, in which there may be an alarm-bell struck and sounded by every token aforesaid for a fare deposited.

In order to enable others skilled in the art to which my invention appertains to make and use the same, I will now describe its construction and operation, referring to the annexed drawings, in which—

Figure 1 is a perspective view of one form of tube and box illustrating the device. Fig. 2 is a longitudinal section of the same.

In the drawings, A represents an inclined tube, which is supported by suitable fixtures (not represented) within a street-railroad car, and extending longitudinally through it, and said tube may extend out over the conductor's platform. One end of the tube is closed, the other end opens into a lock-box, B, in which an alarm-bell, C, may be located. The key of this box will be in the keeping of the owners, and access thereto by the conductor prohibited.

Openings *a a* are made into the tube A at intervals convenient to deposit the token of payment for the fare at any point along the length of the car desired. These openings should be made of a size proper to receive the balls *b* or tokens used representing the fares paid.

In the drawings, the tube A is shown cylindrical in form and composed of alternate sections of glass (in which the openings *a* are placed that enable the tokens dropped therein to be seen) and of metal; but I do not confine myself either to the cylindrical shape or material of the tube, as it may be made of any convenient material or combination of materials desired, and also of any shape in its cross-section, which may be polygonal, and it may have a longitudinal slot in the top or upper side for the admission of the tokens of payment for fares. In the construction of this tube or trough I prefer to make certain parts thereof of glass or other suitable transparent material, so that the passengers or conductor can see the tokens of payment for the fares as they pass through the same. If for every fare collected a ball, *b*, is dropped into any one of the openings at any point along the tube it will roll down into the lock-box B and strike the alarm-bell C, if located therein. If one passenger settles the payment for himself and others an alarm can be sounded for each by dropping in separate balls for every one.

This device is convenient, simple, cheap, and durable, answering the purpose for which it is intended—namely, to collect the tokens of payment for the fares with greater convenience and prevent conductors from defrauding their employers.

A registering apparatus may be arranged within the lock-box B to register the tokens of payment for the fares as they drop into it. Balls of two sizes or different colors may be used to denote full and half fares.

Having thus fully described my invention, I claim—

A collecting device for street-railroad cars, consisting of a longitudinally-arranged continuous tube or trough terminating at one end in a lock-box, and having along its length at suitable points a series of apertures or openings, substantially as and for the purpose set forth.

In testimony whereof I have hereto set my hand this 28th day of June, 1881.

In presence of— CHAS. G. IMLAY.

CHAS. F. VAN HORN,

EDWIN PARAMORE.